June 15, 1965 C. J. BROWN, JR., ETAL 3,189,326
MIXING GLASS BATCH MATERIALS
Filed April 15, 1963 3 Sheets-Sheet 1

INVENTORS
Chester J. Brown, Jr.
BY and Delmar E. Carney
Nobbe & Swope
ATTORNEYS

June 15, 1965   C. J. BROWN, JR., ETAL   3,189,326
MIXING GLASS BATCH MATERIALS
Filed April 15, 1963   3 Sheets-Sheet 2

INVENTORS
Chester J. Brown, Jr.
BY and Delmar E. Cairney
Hobbe & Swope
ATTORNEYS

3,189,326
MIXING GLASS BATCH MATERIALS
Chester J. Brown, Jr., and Delmar E. Carney, Toledo, Ohio, assignors to Libbey-Owens-Ford Glass Company, Toledo, Ohio, a corporation of Ohio
Filed Apr. 15, 1963, Ser. No. 272,970
16 Claims. (Cl. 259—15)

The present invention relates to the intermixing of separate glass batch ingredients and the distribution of a liquid medium through the intermixed ingredients. More particularly, it pertains to preventing the building up of a layer of the glass making materials upon the elements of the apparatus used in the mixing thereof. The invention applies to the general class of solid-state mixers characterized by a shallow, horizontal pan revolving around a vertical axis and equipped with a plurality of mixing tools.

It is an object of the invention to provide a novel system for preventing the accumulation of batch materials on the walls and mixing elements of apparatus used for the mixing of glass batch ingredients and for distributing a liquid medium therethrough.

Another object of the invention is to dislodge deposits of the batch materials from such mixing apparatus by subjecting the deposits to repeated impact.

Still another object of the invention is to remove moisture from exposed surfaces of the mixing elements in such mixing apparatus so as to reduce the tendency thereof to accumulate batch materials, as well as to dislodge deposits of the materials from the mixing elements, by subjecting portions of the mixing elements to periodic blasts of compressed air.

Other objects and advantages of the invention will become more apparent during the course of the following description when taken in connection with the accompanying drawings.

In the drawings, wherein like numerals are employed to designate like parts throughout the same:

In the production of sheet or plate glass, basic raw materials such as sand, limestone and soda ash, along with lesser amounts of minor ingredients, are intermixed in predetermined proportions and charged into the melting end of a tank furnace. The combined ingredients, or so-called batch, must be thoroughly intermixed to achieve a homogeneous state, and this homogeneous state must be maintained until the batch is melted and integrated into the molten mass within the tank in order to produce glass of consistently high quality. Even where complete homogeneity is obtained during mixing, the batch exhibits a tendency to segregate according to particle size and density during subsequent handling and feeding into the furnace, and even during the initial movement within the melting area of the furnace before it has melted and become integrated into the molten mass. It has been found that a small amount of a liquid medium, such as water, if dispersed through the batch so that each particle is at least partially wetted, will substantially reduce if not entirely eliminate this segregation, as well as the well known companion problem of "dusting" wherein fine particles of the batch ingredients are carried into the turbulent atmosphere over the molten glass within the furnace prior to melting and deposited in the checkerwork of the regenerators.

A mixer of the countercurrent type is extremely efficient in preparing glass batch and will create a high degree of homogeneity in the batch with a relatively short mixing cycle. There is disclosed in copending application, Serial No. 185,266 filed on April 5, 1962, such a mixer having a novel system for administering a liquid medium to the batch, reference to which may be had for a full and complete understanding thereof. However, the batch containing the liquid medium tends to adhere to the interior of the mixer and the mixing elements with which it comes in contact. A scraper has conventionally been employed to prevent this build-up on the mixer wall, but the scraper has not been found completely satisfactory in that due to the abrasive nature of the batch material, the scraper wears or erodes and must be constantly adjusted and frequently replaced. It is not practical to prevent the build-up of material on the rotating mixing elements themselves with scrapers, so that periodically use of the mixer must be interrupted while these elements are manually cleaned. Additionally, if large deposits of batch are allowed to accumulate on the mixer elements and wall, fragments may be dislodged therefrom and dropped into the batch during operation of the mixer, and the fragments may subsequent interfere with operation of the furnace.

It will be understood that while the present invention is described in detail with particular reference to the mixing of glass batch materials, it is not to be so limited but is adapted to the mixing of any granular materials.

Figure 1:
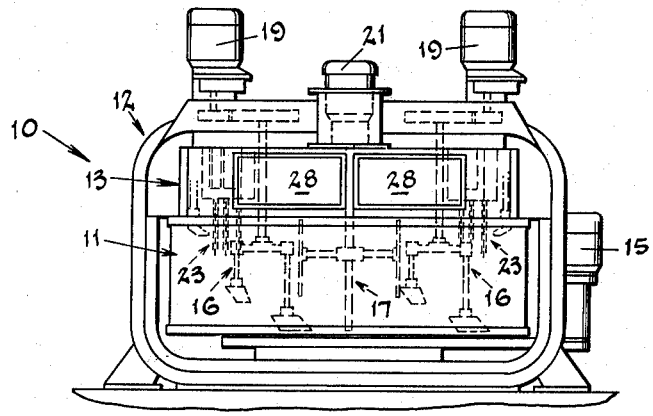
FIG. 1 is a side elevation of the apparatus of the invention with the interior structure thereof shown in broken lines.
Figure 2:
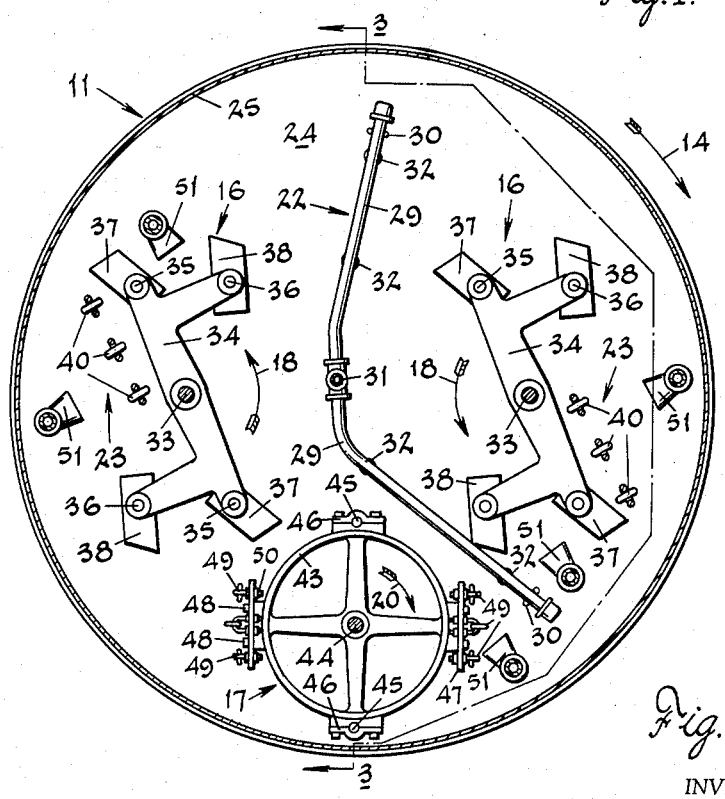
FIG. 2 is a plan view of the mixing pan of the apparatus, with parts broken away, showing the location of the mixing tools, spray system and cleaning elements within the mixing pan.

Referring now to the drawings, and in particular to FIG. 1 thereof, there is shown generally at 10 a countercurrent type mixer comprising a cylindrical mixing pan 11 mounted within a framework 12 for rotation about a vertical axis. A stationary hood 13 is mounted over the mixing pan to prevent the escape of dust during operation of the mixer. The mixing pan is caused to rotate in the direction of the arrow 14 (FIG. 2) by a motor 15 connected to the pan through suitable gearing (not shown). The actual mixing action is caused by mixing stars 16 and a rotor cage 17 located within the mixing pan. Although a single rotor cage has been indicated for purposes of illustration, a second rotor cage, if required, may be installed in the opposite quadrant of the mixing pan as is fully disclosed in the above-cited co-pending application. During the mixing cycle, to be hereinafter described, the mixing stars are driven in the direction of arrows 18 by motors 19 while the rotor cage is driven in the direction of arrow 20 by a motor 21. A spray system 22 is located in the hood 13 for depositing a wetting medium upon the batch materials within the mixer, and a cleaning system, indicated generally at 23, is positioned so as to remove any batch materials which tend to collect upon the rotor cage, mixing stars and mixing pan.

Briefly, the mixing cycle consists of first charging predetermined amounts of dry batch ingredients into the mixer and then thoroughly intermixing the ingredients in the dry state by rotating the pan 11 and mixing stars 16.

When the ingredients are thoroughly intermixed, the spray system 22 is activated to deposit the wetting medium upon the surface thereof while the stars and mixing pan continue to operate. At this time, the rotor cage 17 is also activated to rotate at a relatively high speed and thereby create a zone of intense mixing within the batch whereby any agglomerates which tend to form will be disintegrated. After the prescribed amount of wetting medium has been added, the spray system is deactivated while the mixing stars and rotor cage continue to operate for a sufficient length of time to distribute the wetting medium and achieve the desired level of homogeneity in the batch. Thereafter, the mixing batch is discharged and the mixer is ready to repeat the mixing cycle.

The mixing pan 11 includes a floor 24 and a cylindrical side wall 25. The stationary hood 13, comprising a side wall 26 and a roof 27, fits in substantially airtight engagement with the side walls of the mixing pan so as to prevent the escape of dust during charging of the batch ingredients into and operation of the mixer, particularly during the dry mixing phase. Doors 28 are located in the stationary hood to provide access to the interior of the mixer when necessary. Accurately weighed amounts of the individual batch ingredients are charged into the mixer through an opening (not shown) in the roof 27 of the hood, and a trap door (not shown) in the floor of the mixing pan is opened at the end of the mixing cycle whereby continued rotation of the pan and mixing stars causes the mixed batch to be discharged. It will be understood that for purposes of simplification, only those features necessary for a full and complete understanding of the invention have been shown and will be described in detail herein.

The spray system 22 is located within the hood 13 and includes distribution pipes 29 whose outer ends are carried by hangers 30. The distribution pipes are connected at their inner ends through a conduit 31 to a suitably regulated source of the liquid medium, and a plurality of spray nozzles 32 are spaced therealong to apply the liquid medium to the surface of the batch. The location and angular cone of discharge of the nozzles are selected so that the liquid medium is uniformly distributed over the surface of the batch and does not impinge directly upon any exposed portion of the mixing stars 16 or rotor cage 17. It has been found that direct wetting of the mixing stars and rotor cage contributes to excesssive building up of batch deposits thereon, and also inhibits the uniform distribution of the wetting medium through the batch.

The mixing stars 16, mounted for rotation on shafts 33 which are in turn connected through suitable gear trains to the motors 19, include a mixing arm 34 from which depend a pair of long shanks 35 and a pair of short shanks 36. The shanks 35 and 36 carry at their lower ends mixing shovels 37 and 38, respectively, with the shovels 37 being positioned near the floor 24 of the pan and the shovels 38 thereabove. The normal level of the batch ingredients in the mixing pan is indicated by the line 39 (FIG. 3) so that in response to rotation of the pan 11 and stars 16, the ingredients are caused to be thoroughly intermixed.

Material generally does not accumulate to any extent on the portions of the mixing elements and pan submerged within the batch due to its abrasive nature, so that most of the accumulation occurs above the level 39 of the batch as a result of particles being thrown up by the mixing elements. The accumulation has been found to be particularly great upon the mixing arms 34 and the upper portion of the pan wall 25. According to the invention, a plurality of short sections 40 of heavy link chain are suspended across the paths of the mixing arms so as to strike the arms during rotation thereof. The chains are suspended from brackets 41 bolted or otherwise attached to the roof 27 of the hood at 42. When struck by the arms, the lower ends of the chains tend to first swing back under the arms and then the entire chains swing upwardly over the arm into the hood at random, where they may strike other portions of the apparatus, and then drop down to be struck by a succeeding end of the arm. The arms generally rotate at a speed such that the chains, particularly those nearest the outer end, do not strike the mixing arm during each half revolution. However, the arms are struck with sufficient regularity to prevent any appreciable build-up of batch thereon.

The rotor cage 17 comprises an annular rotor frame 43 mounted for rotation on a shaft 44 adapted to be driven through a gear train by the motor 21 at a relatively high speed. A pair of oppositely disposed rotor bars 45 are mounted on the periphery of the frame 43 by clamps 46 and extend down into the batch. As previously described, in conventional apparatus of this type a stationary side wall scraper is positioned adjacent the inner surface of the wall 25 to remove accumulated batch therefrom in response to rotation of the pan 11. Such scrapers have proven unsatisfactory in the mixing of glass batch, however, due to the abrasiveness of the batch which causes them to be rapidly worn away. Thus, according to the present invention the side wall scraper is omitted, and mounting plates 47 are secured to the rotor frame as by bolts 48, with a plurality of short lengths of chain 49 being bolted or otherwise fastened to the mounting plates at 50. The chains 49 are of such a length as to centrifugally swing out and strike the wall 25 of the pan during rotation of the rotor cage. Since the rotor cage rotates at a relatively high speed with respect to the mixing pan during at least a portion of the mixing cycle, the chains 49 will strike the wall 25 at random points many times during each revolution of the pan and by their flailing action prevent the accumulation of batch materials thereon.

Figure 3:
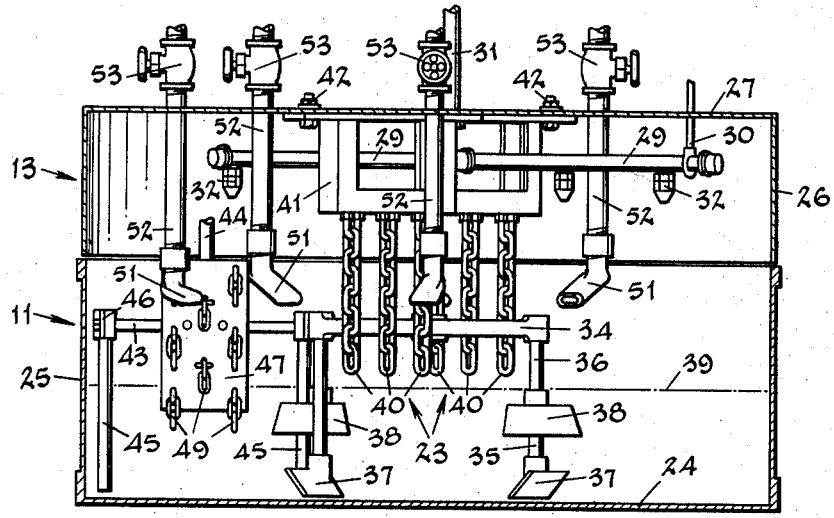
FIG. 3 is a sectional elevational view taken substantially along line 3—3 of FIG. 2.
Figure 4:
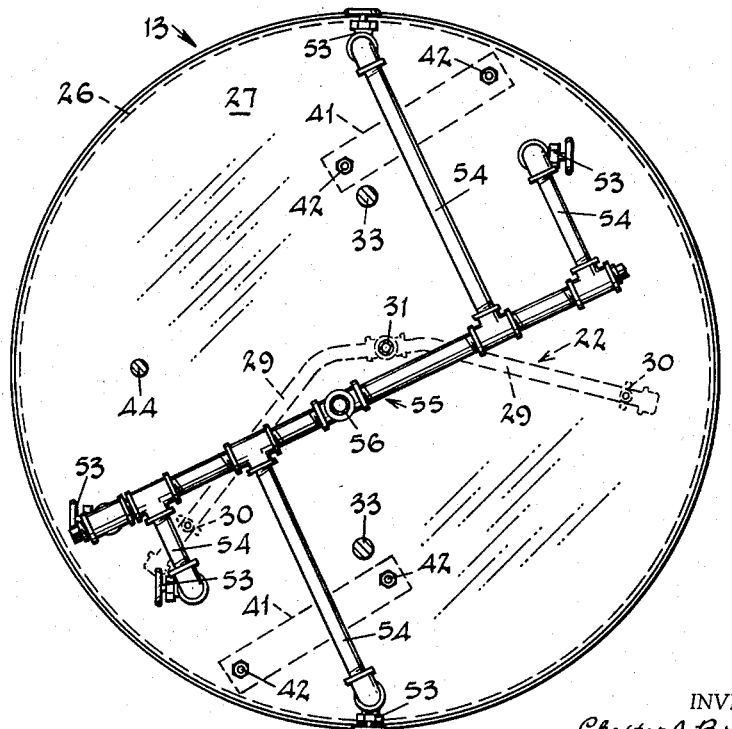
FIG. 4 is a plan view, as viewed from above in FIG. 3, showing the piping arrangement for the air blast system.

During addition of the liquid medium and the subsequent distribution thereof through the batch, the humidity within the mixer is extremely high, causing the exposed portions of the mixing elements and pan to become damp so that batch particles readily adhere thereto. In order to dry the interior of the mixer between mixing cycles and before the dry materials are admitted for the subsequent mixing cycle, as well as to aid in removing deposits of batch from the upper portions of the mixing elements, a plurality of air nozzles 51 are strategically located so as to direct streams of air at high pressure onto the rotating mixing elements following discharge of the mixed batch. In the particular arrangement illustrated in the drawings, two of the nozzles 51 are directed toward the mixing arm 34 of each mixing star and a single nozzle is directed toward the frame 43 of the rotor cage, although it is contemplated that the location of the nozzles may be varied and their number may be increased where operating conditions warrant. As best shown in FIGS. 3 and 4, the nozzles are connected through outlet pipes 52, manually adjustable valves 53 and distribution pipes 54 to a manifold 55. The manifold receives air at a suitable pressure through an inlet pipe 56 according to a predetermined sequence and timed in relation to the mixing cycle by a conventional control device (not shown). Relative air pressure between the various nozzles 51 may be controlled by adjustment of the individual valves 53. An air blast through the nozzles of from 10 to 30 seconds duration at about 90 p.s.i. following discharge of the mixed and wetted batch from the mixer has been found to successfully prevent accumulation thereof on the upper portions of the mixing stars and rotor cage as well as cause substantial drying of the members.

Figure 5:
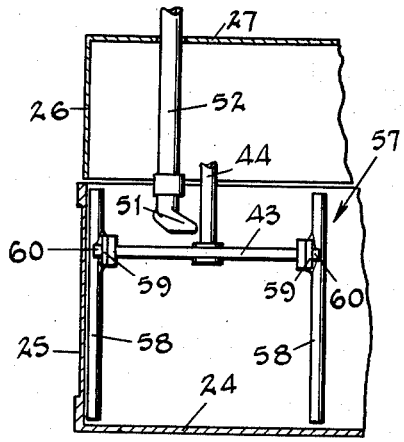
FIG. 5 is a fragmentary elevational view, partially in section, showing an alternate embodiment of the rotor cage of the invention.
Figure 6:
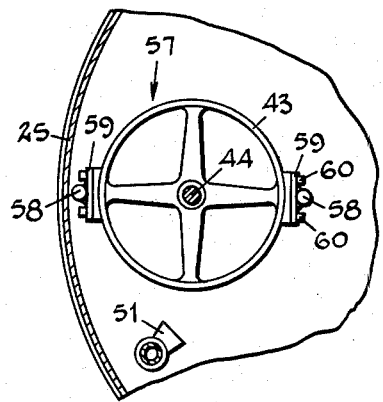
FIG. 6 is a fragmentary plan view of the rotor cage of FIG. 5.

There is shown in FIGS. 5 and 6 an alternate embodiment of the invention employing a modified rotor cage 57. The rotor cage 57 differs from that of the preferred embodiment as previously described in that the mounting plates 47 and chains 49 are omitted. Instead, rotor bars 58 have spacers 59 welded or otherwise affixed thereto by which the rotor bars are secured outwardly of the rotor frame 43 as by bolts 60. The radial distance of the rotor bars from the rotor shaft 44 is such that the bars swing very close to the pan wall 25 during rotation of the rotor cage. By thus swinging in an arc spaced from the pan wall a distance of ½ inch or less, and preferably a distance on the order of ¼ to ⅛ inch, the rotor bars cause any batch particles accumulating on the wall to be dislodged therefrom by impact either with the rotor bars themselves or with other batch particles. An air nozzle 51 prevents build-up of batch materials upon the rotor frame as in the previously described embodiment. It is also contemplated that ordinary channel-shaped sections may be substituted for the rotor bars 58, the flanges of the channel sections facing outwardly to swing in an arc closely adjacent the pan wall.

Figure 7:
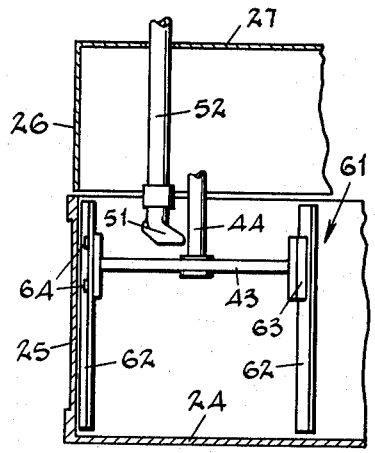
FIG. 7 is a fragmentary elevational view, partially in section, of another embodiment of the rotor cage.
Figure 8:
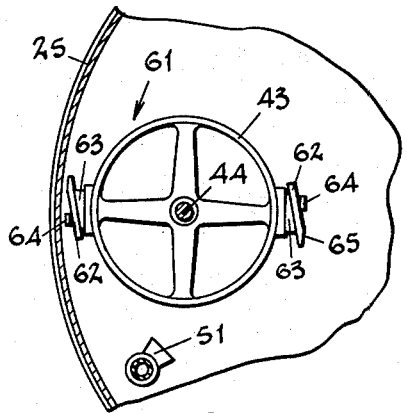
FIG. 8 is a fragmentary plan view of the rotor cage of FIG. 7.

Another modification is illustrated in FIGS. 7 and 8 wherein a rotor cage 61 has a pair of oppositely disposed scraper plates 62 adjustably secured to the rotor frame 43 thereof as by wedge blocks 63 and clamping bolts 64. The leading edge of the scraper plate is tapered at 65 on the side adjacent the pan side wall. The openings (not shown) in the scraper plate and wedge block through which the bolts 64 pass are preferably elongated in the horizontal direction so that by proper manipulation of the two members and the clamping bolts, the position of the tapered leading edge 65 and its distance from the wall 25 can be suitably adjusted. As in the embodiment of FIGS. 5 and 6, the scraper plate is preferably adjusted to swing within about ⅛ to ¼ inch of the wall 25 during rotation of the rotor cage so that batch build-up is prevented by impaction. If batch materials should build-up on the wall, the thickness of the layer will be limited by the scraping action of the plates 62 as the rotor cage rotates.

Reviewing now the operation of the invention, the separate batch ingredients are charged into the mixer in predetermined amounts and the ingredients are thoroughly intermixed in the dry state by the mixing stars 16. As the stars rotate, the arms 34 thereof strike the chains 40 suspended in their paths, the impact of which removes material adhering to the arms. The wetting medium is then sprayed onto the surface of the batch and at the same time the rotor cage 17 is activated. The chains 49 carried by the rotating rotor cage swing out and strike the wall of the mixing pan preventing the wetted batch from adhering thereto. When the wetting medium has been uniformly distributed, the batch is discharged through an opening in the floor 24 of the pan by the rotary action of the stars 16. Either during discharge of the batch or immediately thereafter, compressed air is directed against the upper portions of the stars and rotor cage from nozzles 51 for removing residual material and drying the mixing elements. Thereafter, the apparatus is ready to receive additional batch ingredients and repeat the mixing cycle.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In a method of preparing glass batch wherein separate batch ingredients are intermixed by first and second rotary mixing elements within a cylindrical mixing pan adapted to rotate in a horizontal plane about its longitudinal axis, the steps of admitting the batch ingredients to the mixing pan and rotating said mixing pan and first and second mixing elements to intermix the batch ingredients, repeatedly subjecting portions of said first mixing element to impact in response to its rotation to prevent accumulation of batch on said portions, and dislodging batch particles adhering to the side wall of said mixing pan by impact in response to rotation of said second mixing element.

2. In a method of preparing glass batch wherein separate batch ingredients are intermixed and a liquid medium is distributed therethrough by first and second rotary mixing elements within a cylindrical mixing pan adapted to rotate in a horizontal plane about its longitudinal axis, the steps of admitting the batch ingredients to the mixing pan, rotating said mixing pan and said first rotary mixing element to cause intermixing of the batch ingredients, repeatedly striking portions of said first mixing element in response to its rotation to prevent accumulation of batch thereon, spraying a liquid medium onto the surface of the batch while continuing to rotate said mixing pan and first mixing element, rotating said second mixing element simultaneous with and subsequent to said spraying to distribute the liquid medium through the batch, and dislodging batch particles adhering to the side wall of said mixing pan by impact in response to rotation of said second mixing element.

3. A method of preparing glass batch as claimed in claim 2, including the steps of discharging the prepared glass batch from said mixing pan, and thereafter subjecting said first and second mixing elements to streams of compressed air to remove moisture and accumulated deposits of batch materials therefrom.

4. In apparatus for preparing glass batch, a cylindrical mixing pan for receiving separate glass batch ingredients, said mixing pan being mounted for rotation in a horizontal plane about its longitudinal axis, first and second rotary mixing elements mounted within said pan for intermixing said batch ingredients in response to rotation of said mixing pan and mixing elements, means for repeatedly striking portions of said first rotary mixing element during its rotation for preventing accumulation of batch materials thereon, and means carried by said second rotary mixing element for dislodging batch materials adhering to the side walls of the mixing pan in response to rotation of said second mixing element.

5. In apparatus for preparing glass batch, in combination, a cylindrical mixing pan for receiving separate glass batch ingredients, said mixing pan being mounted for rotation in a substantially horizontal plane about its longitudinal axis, a plurality of mixing elements mounted for rotation about vertical axes within said mixing pan to cause intermixing of said batch ingredients in response to rotation of said mixing pan and mixing elements, said mixing elements comprising at least one mixing star and at least one rotor cage, means for repeatedly striking portions of said mixing star during its rotation for preventing accumulation of batch materials thereon, and means carried by the rotor cage for dislodging batch materials adhering to the side walls of the mixing pan during rotation of said rotor cage.

6. Apparatus for preparing glass batch as claimed in claim 5, including spray means mounted above said mixing elements for depositing a liquid medium on the surface of the glass batch ingredients, and means for periodically directing streams of air at relatively high pressure against the mixing elements to remove moisture from said mixing elements and prevent accumulation of batch materials thereon.

7. Apparatus for preparing glass batch as claimed in claim 5, wherein said means for preventing accumulation of batch materials on the mixing star comprises sections of link chain suspended in the path of the mixing star so as to be struck by said mixing star during rotation thereof.

8. Apparatus for preparing glass batch as claimed in claim 5, wherein said means for dislodging batch materials adhering to the side wall of the mixing pan comprises means carried by the rotor cage for repeatedly striking the side wall of said mixing pan during rotation of said rotor cage.

9. In apparatus for mixing glass batch and distributing a liquid medium therethrough, in combination, a cylindrical mixing pan for receiving separate glass batch ingredients, said mixing pan being mounted for rotation in a substantially horizontal plane about its longitudinal axis, mixing elements including a mixing star and a rotor cage mounted for rotation about vertical axes within said mixing pan for intermixing said batch ingredients in response to rotation of said mixing pan and mixing elements, sections of link chain suspended in the path of the mixing star so as to be struck by said mixing star during its rotation for preventing accumulation of batch materials thereon, means carried by the rotor cage for dislodging batch materials adhering to the side walls of the mixing pan in response to rotation of said rotor cage and mixing pan, spray means mounted above said mixing elements for depositing the liquid medium on the surface of the glass batch ingredients, and a plurality of nozzles for periodically directing streams of air at relatively high pressure against portions of the mixing elements to remove moisture from said mixing elements and prevent accumulation of batch materials thereon.

10. Apparatus for mixing glass batch as claimed in claim 9, wherein said means carried by the rotor cage for dislodging batch materials from the mixing pan side walls includes a plurality of sections of link chain adapted to centrifugally swing out and strike said side wall during rotation of said rotor cage.

11. Apparatus for mixing glass batch as claimed in claim 9, wherein said rotor cage comprises an annular rotor frame, a pair of oppositely disposed rotor bars secured to the periphery of said rotor frame and extending downwardly into said batch ingredients, a pair of oppositely disposed mounting plates secured to the periphery of said rotor frame, and a plurality of sections of link chain secured to each said mounting plate, each said link chain being of a length sufficient to strike the side wall of said mixing pan during rotation of the rotor cage.

12. Apparatus for mixing glass batch as claimed in claim 9, wherein said rotor cage includes an annular rotor frame and a pair of oppositely disposed rotor bars secured to the periphery of said annular frame and extending downwardly into said batch materials, said rotor bars being positioned so as to swing in an arc spaced not more than ½ inch from said side wall during rotation of said rotor cage.

13. Apparatus for mixing glass batch as claimed in claim 9, wherein said rotor cage includes an annular rotor frame and a pair of oppositely disposed scraper plates secured to the periphery of said rotor frame, the leading edge of said scraper plates being tapered, and the scraper plates being positioned so that said tapered leading edge swings in an arc spaced about ⅛ to ¼ inch from said mixing pan side wall during rotation of said rotor cage.

14. In apparatus for mixing glass batch and distributing a liquid medium therethrough, in combination, a cylindrical mixing pan for receiving separate glass batch ingredients, said mixing pan being mounted for rotation in a substantially horizontal plane about its longitudinal axis, mixing elements including a mixing star and a rotor cage mounted for rotation about vertical axes within said mixing pan for intermixing said batch ingredients in response to rotation of said mixing pan and mixing elements, sections of link chain suspended in the path of the mixing star so as to be struck by said mixing star during its rotation for preventing accumulation of batch materials thereon, means carried by the rotor cage for dislodging batch materials adhering to the side walls of the mixing pan in response to rotation of said rotor cage and mixing pan, said rotor cage comprising an annular rotor frame, a pair of oppositely disposed rotor bars secured to the periphery of said rotor frame and extending downwardly into said batch ingredients, a pair of oppositely disposed mounting plates secured to the periphery of said rotor frame, and a plurality of sections of link chain secured to each said mounting plate, each said link chain being of a length sufficient to strike the side wall of said mixing pan during rotation of the rotor cage.

15. Apparatus for mixing glass batch as claimed in claim 14, wherein said rotor cage includes an annular rotor frame and a pair of oppositely disposed rotor bars secured to the periphery of said annular frame and extending downwardly into said batch materials, said rotor bars being positioned so as to swing in an arc spaced not more than ½ inch from said side wall during rotation of said rotor cage.

16. Apparatus for mixing glass batch as claimed in claim 14, wherein said rotor cage includes an annular rotor frame and a pair of oppositely disposed scraper plates secured to the periphery of said rotor frame, the leading edge of said scraper plates being tapered, and the scraper plates being positioned so that said tapered leading edge swings in an arc spaced about ⅛ to ¼ inch from said mixing pan side wall during rotation of said rotor cage.

References Cited by the Examiner
UNITED STATES PATENTS

| | | | |
|---|---|---|---|
| 966,522 | 8/10 | Buschman | 15—89 |
| 1,521,564 | 12/24 | Rogler | 259—44 |
| 2,003,649 | 6/35 | Hasselbach | 263—33 |
| 2,228,421 | 1/41 | Taylor | 15—104.14 X |
| 2,808,239 | 10/57 | Reiffen | 269—84 X |
| 3,049,809 | 8/62 | Sellers | 34—114 X |
| 3,081,983 | 3/63 | Thibodeaux | 259—178 |
| 3,109,632 | 11/63 | Wiegel | 289—84 |

FOREIGN PATENTS

| | | |
|---|---|---|
| 18,916 | 11/89 | Great Britain. |

CHARLES A. WILLMUTH, *Primary Examiner.*